(12) United States Patent
Lee et al.

(10) Patent No.: US 9,791,740 B2
(45) Date of Patent: Oct. 17, 2017

(54) BACKLIGHT MODULE AND LIQUID CRYSTAL DISPLAY

(71) Applicant: Radiant Opto-Electronics Corporation, Kaohsiung (TW)

(72) Inventors: Yu-Ju Lee, Kaohsiung (TW); Tsung-Chen Tung, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 64 days.

(21) Appl. No.: 14/641,450

(22) Filed: Mar. 9, 2015

(65) Prior Publication Data
US 2016/0116786 A1   Apr. 28, 2016

(30) Foreign Application Priority Data

Oct. 27, 2014  (TW) .............................. 103137046 A (51) Int. Cl.
*G02F 1/1335*   (2006.01)
*F21V 8/00*     (2006.01)

(52) U.S. Cl.
CPC ..... *G02F 1/133615* (2013.01); *G02B 6/0055* (2013.01); *G02B 6/0088* (2013.01); *G02F 2202/28* (2013.01)

(58) Field of Classification Search
CPC ............ G02F 1/133308; G02B 6/0081; G02B 6/0031
USPC ........................................................ 349/113
See application file for complete search history.

(56) References Cited

U.S. PATENT DOCUMENTS

| | | | |
|---|---|---|---|
| 2007/0252922 A1* | 11/2007 | Oohira .............. | G02F 1/133308 349/58 |
| 2008/0291360 A1 | 11/2008 | Pei | |
| 2009/0322989 A1* | 12/2009 | Kim .................. | G02F 1/133308 349/65 |
| 2013/0050612 A1* | 2/2013 | Hur ................... | G02F 1/133603 349/62 |

FOREIGN PATENT DOCUMENTS

| | | | |
|---|---|---|---|
| CN | 201097050 Y | | 8/2008 |
| CN | 201916784 U | | 8/2011 |
| CN | 202203802 U | | 4/2012 |
| CN | 103576359 A | | 2/2014 |
| JP | 2005017613 A | | 1/2005 |
| JP | 2006244843 A | | 9/2006 |
| JP | 2008171719 A | * | 7/2008 |
| KR | 2006038115 | * | 5/2006 |
| KR | 20070081973 A | | 8/2007 |
| TW | 200500733 | | 1/2005 |
| TW | 201317682 | | 5/2013 |
| TW | 201346394 | | 11/2013 |

* cited by examiner

*Primary Examiner* — Hoan C Nguyen
(74) *Attorney, Agent, or Firm* — CKC & Partners Co., Ltd.

(57) ABSTRACT

A backlight module and a liquid crystal display are provided. The backlight module includes a back plate, at least one adhesive member, a reflecting film, a light guide plate and a light source. The adhesive member is disposed on the back plate. A reflecting film is engaged with the adhesive member and is positioned on the back plate. The light guide plate is disposed on the reflecting film, in which a portion of the light guide plate is adhered to the back plate by the adhesive member. The light source is disposed on the back plate for emitting light towards a light-incident surface of the light guide plate.

17 Claims, 6 Drawing Sheets

BACKLIGHT MODULE AND LIQUID CRYSTAL DISPLAY

RELATED APPLICATIONS

This application claims priority to Taiwan Application Serial Number 103137046, filed Oct. 27, 2014, which is herein incorporated by reference.

BACKGROUND

Field of Invention

The present invention relates to a light source module. More particularly, the present invention relates to a backlight module and application in a liquid crystal display thereof.

Description of Related Art

A backlight module is one of the critical components of a liquid crystal display. Currently, liquid crystal displays have been widely used in portable electronic products with high-growth potentials, such as cell phones, notebook computers, digital cameras, etc. With the trend of portable electronic products toward thinness and lightweight, how to reduce the thickness of the backlight module is an object to which people in the related industries are devoted.

Figure 1:
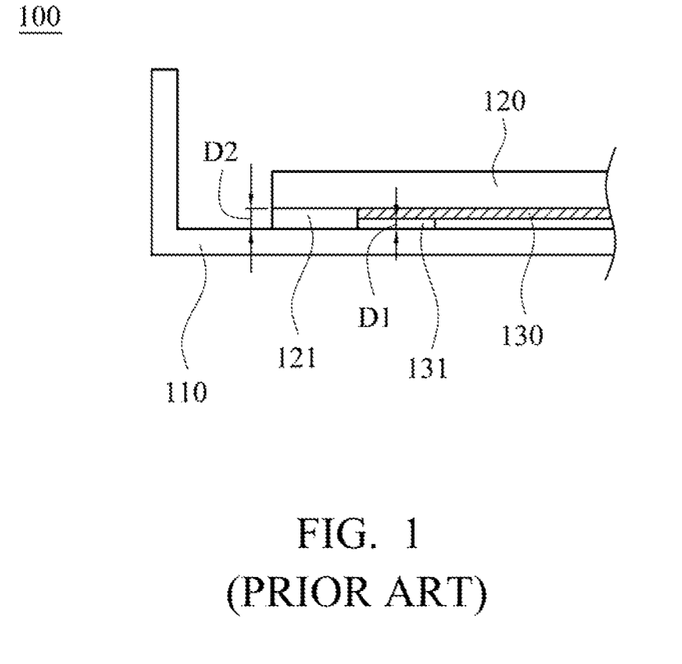
FIG. 1 is a schematic cross-sectional view showing a conventional backlight module.

Referring to FIG. 1, FIG. 1 is a schematic cross-sectional view showing a conventional backlight module 100. In the design of the conventional backlight module 100, for securing a light guide plate 120 and a reflecting film 130 on a back plate 110, a double faced adhesive tape 131 is firstly disposed on a bottom surface of the reflecting film 130 to attach the reflecting film 130 to the back plate 110, and another double faced adhesive tape 121 is used to attach the light guide plate 120 to the back plate 110 thereafter.

However, because the reflecting film 130 itself has a thickness, with the addition of a thickness D1 of the double faced adhesive tape 131, a double faced adhesive tape 121 with a larger thickness D2 needs to be used to fix the light guide plate 120 on the back plate 110, such that the reflecting film 130 can be aligned with a top surface of the double faced adhesive tape 121. Accordingly, the light guide plate 120 can be aligned with the reflecting film 130 after being attached on the double faced adhesive tape 121. Therefore, this securing method is disadvantageous for thinning the backlight module and the liquid crystal display.

SUMMARY

One object of the present invention is to provide a backlight module and a liquid crystal display which can meet the trend of thinness and lightweight of portable electronic products.

According to the aforementioned object, a backlight module is provided. The backlight module includes a back plate, at least one adhesive member, a reflecting film, a light guide plate and a light source. The adhesive member is disposed on the back plate. A reflecting film is engaged with the adhesive member and is positioned on the back plate. The light guide plate is disposed on the reflecting film, and a portion of the light guide plate is adhered to the back plate by the adhesive member. The light source is disposed on the back plate for emitting light towards a light-incident surface of the light guide plate.

According to an embodiment of the present invention, the adhesive member is a double faced adhesive tape or an omni-directional adhesive.

According to an embodiment of the present invention, the at least one adhesive member is embedded in the reflecting film or engaged with at least one side of the reflecting film.

According to an embodiment of the present invention, the reflecting film has at least one opening, the adhesive member is disposed in the opening, and a portion of the light guide plate is overlapped the opening such that the light guide plate is adhered to the back plate through the adhesive member.

According to an embodiment of the present invention, the opening is located at any side of the reflecting film other than the side which is adjacent to the light source.

According to an embodiment of the present invention, the at least one adhesive member is corresponding to the at least one opening in a one-to-one manner.

According to an embodiment of the present invention, the opening receives a plurality of the adhesive members.

According to an embodiment of the present invention, there is a gap between the adhesive member and an inner side of the opening.

According to an embodiment of the present invention, at least one side of the reflecting film comprises at least one position-limiting structure, and the adhesive member comprises at least one position-limiting portion correspondingly engaged with the at least one position-limiting structure.

According to an embodiment of the present invention, the side of the reflecting film is located in an inner side of the light guide plate corresponding to the side of the reflecting film so as to form at least one space between the back plate and the light guide plate, and the adhesive member is disposed in the space so as to be connected with the reflecting film by engaging the position-limiting portion with the position-limiting structure.

According to an embodiment of the present invention, the position-limiting structure of the reflecting film is a convex portion or a concave portion, and the position-limiting portion of the adhesive member is another concave portion corresponding to the convex portion or another convex portion corresponding to the concave portion.

According to an embodiment of the present invention, the space is located at any side of the reflecting film other than the side which is adjacent to the light source.

According to an embodiment of the present invention, the at least one adhesive member is corresponding to the at least one space in a one-to-one manner.

According to an embodiment of the present invention, the space receives a plurality of the adhesive members.

According to the aforementioned object, a liquid crystal display is provided. The liquid crystal display includes the aforementioned backlight module, a frame and a liquid crystal panel. The frame is disposed on the back plate. The liquid crystal panel is disposed on the frame.

According to an embodiment of the present invention, the frame has a recess, and a side of the reflecting film is located in the recess.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiments, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 2:
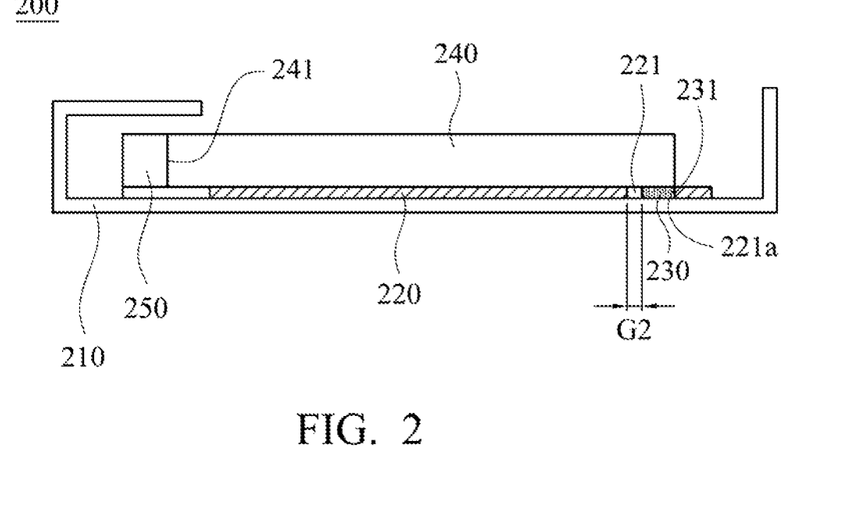
FIG. 2 is a schematic cross-sectional view showing a backlight module in accordance with a first embodiment of the present invention.
Figure 3:
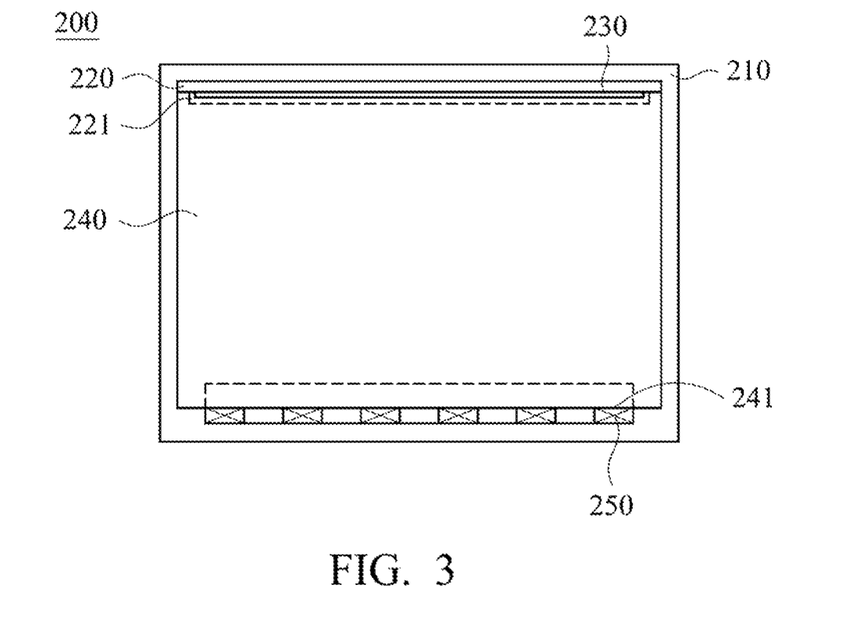
FIG. 3 is a schematic top view showing the backlight module in accordance with the first embodiment of the present invention.

Referring to FIG. 2 and FIG. 3, FIG. 2 and FIG. 3 are a schematic cross-sectional view and a schematic top view showing a backlight module in accordance with a first embodiment of the present invention. In the present embodiment, a backlight module 200 includes a back plate 210, a reflecting film 220, at least one adhesive member 230, a light guide plate 240 and a light source 250. The reflecting film 220 is disposed on the back plate 210. As shown in FIG. 2, the reflecting film 220 has at least one opening 221. It is noted that the opening 221 in the present embodiment is an area formed by trimming a portion of the reflecting film 220. Therefore, when the reflecting film 220 is disposed on the back plate 210, the opening 221 can be considered as a space between the light guide plate 240 and the back plate 210.

Figure 4:
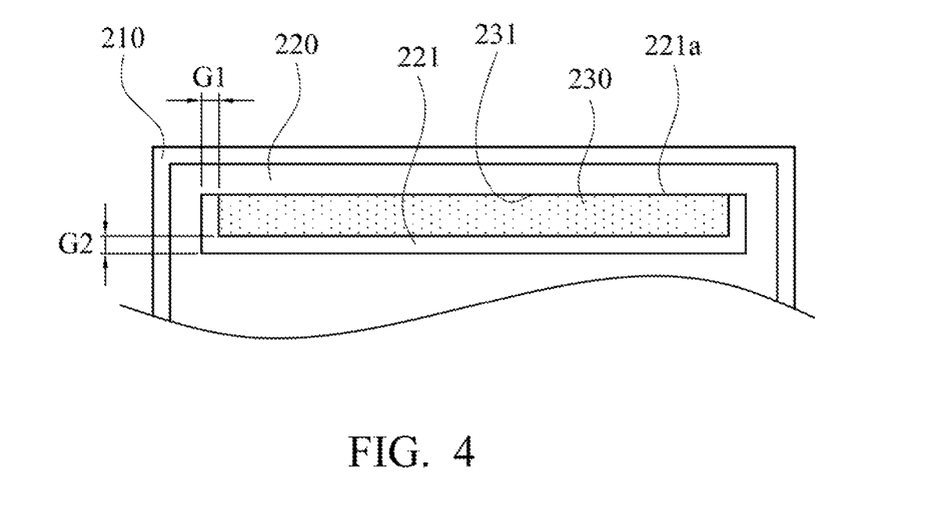
FIG. 4 is a schematic structural diagram showing a reflecting film adhered to a back plate in accordance with the first embodiment of the present invention.

Simultaneously referring to FIG. 2 to FIG. 4, FIG. 4 is a schematic structural diagram showing the reflecting film adhered to the back plate in accordance with the first embodiment of the present invention. The opening 221 is mainly used to receive the adhesive member 230, and the reflecting film 220 can be adhered to the back plate 210 by using the adhesive member 230. As shown in FIG. 4, when the adhesive member 230 is disposed in the opening 221, a portion of the adhesive member 230 is connected with at least one portion of an inner side 221a of the opening 221. In other words, the adhesive member 230 is embedded in the reflecting film 220. In one example, one side 231 of the adhesive member 230 is connected with one portion of the inner side 221a of the opening 221. Moreover, there are gaps G1 and G2 between the adhesive member 230 and other portions of the inner side 221a of the opening 221. In other words, the dimension of the opening 221 is larger than that of the adhesive member 230, which is convenient for workers to fix the reflecting film 220 on a correct position of the back plate 210. In addition, the gap G1 and the gap G2 can provide tolerance for allowing the reflecting film 220 to expand therein, so as to prevent the reflecting film 220 from being deformed due to temperature variation. In some specific examples, the dimension of the opening 221 is substantially equal to that of the adhesive member 230.

Referring to FIG. 2 and FIG. 3 again, the light guide plate 240 is disposed on the reflecting film 220. Moreover, a portion of the light guide plate 240 is overlapped the opening 221 and can be adhered to the back plate 210 through the adhesive member 230. In other words, the adhesive member 230 in the present embodiment is an omni-directional adhesive which has function of sticking on the side. Therefore, not only the light guide plate 240 but also the reflecting film 220 can be adhered to the back plate 210. In other embodiments, the adhesive member 230 is a double faced adhesive tape and peripheral sides of the adhesive member 230 do not have function of sticking to make the light guide plate 240 be adhered to the back plate 210, so that the reflecting film 220 can be restrained between the back plate 210 and the light guide plate 240 instead of being adhered to the back plate through the adhesive member 230. In these embodiments, the reflecting film 220 is fixed on the back plate 210 by placing the adhesive member 230 through the opening 221. As shown in FIG. 2 and FIG. 3, the light source 250 is disposed on the back plate 210 to emit light towards a light-indicant surface 241 of the light guide plate 240. In some embodiments, the opening 221 and the adhesive member 230 are disposed on a side of the reflecting film 220 away from the light source 250, so as to prevent the opening 221 from affecting optical effect due to too close to the light source 250.

Figure 5:
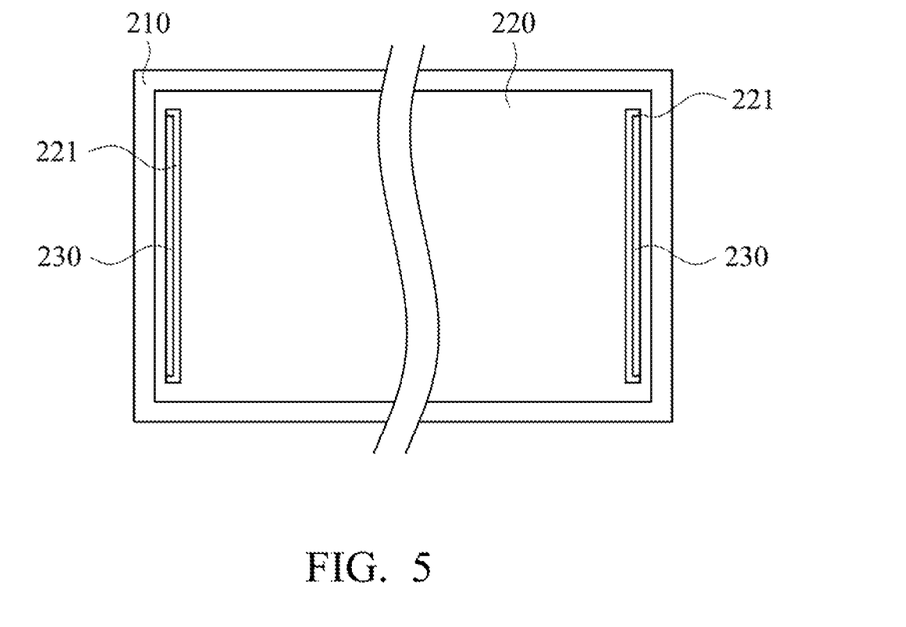
FIG. 5 is a schematic structural diagram showing another reflecting film adhered to the back plate in accordance with the first embodiment of the present invention.

Referring to FIG. 5, FIG. 5 is a schematic structural diagram showing another reflecting film adhered to the back plate in accordance with the first embodiment of the present invention. In other embodiments, the number of the openings 221 of the reflecting film 220 is more than one, and the openings 221 can be disposed on any two sides or three sides of the reflecting film 220 away from the light source 250, so as to meet different requirements of the backlight module.

Figure 6A:
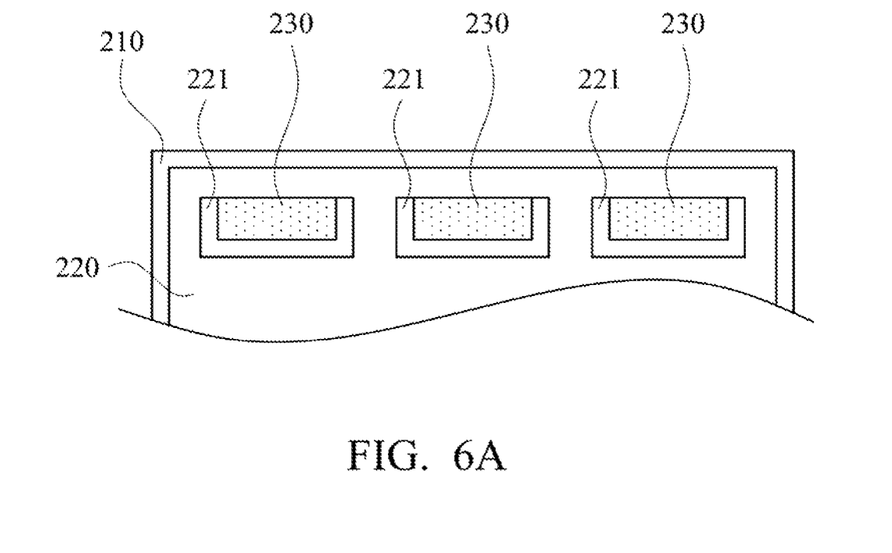
FIG. 6A is a schematic structural diagram showing another reflecting film adhered to the back plate in accordance with the first embodiment of the present invention.
Figure 6B:
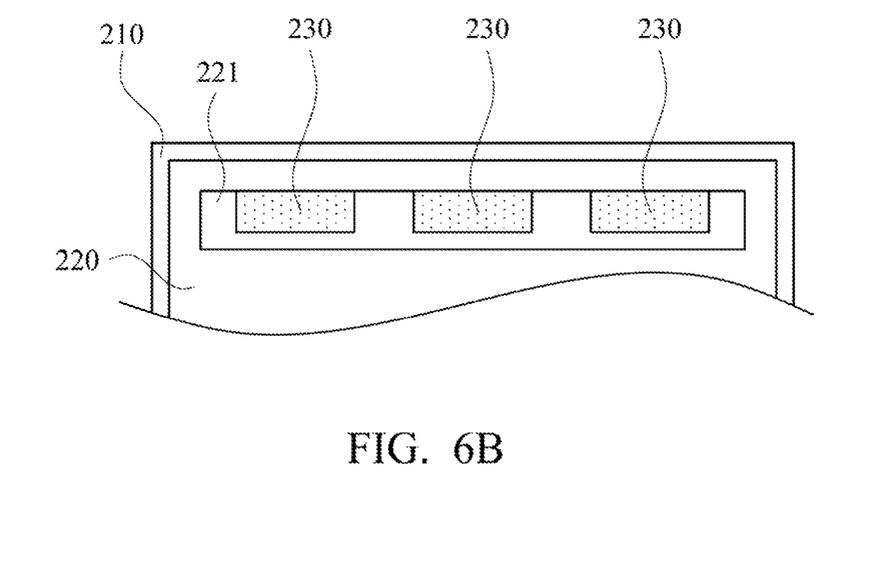
FIG. 6B is a schematic structural diagram showing another reflecting film adhered to the back plate in accordance with the first embodiment of the present invention.

Simultaneously referring to FIG. 4, FIG. 6A and FIG. 6B, in which FIG. 6A and FIG. 6B are schematic structural diagrams respectively showing the different types of the reflecting film being respectively adhered to the back plate in accordance with the first embodiment of the present invention. As shown in FIG. 4, each of the openings 221 and the adhesive member 230 is one single elongated structure. In other examples, as shown in FIG. 6A, the number of the openings 221 is more than one. The number of the adhesive members 230 is the same as that of the openings 221, and the adhesive members 230 are disposed in the respective openings 221 to meet different design requirements. In other embodiments, as shown in FIG. 6B, the opening 221 is one single elongated structure, and the number of the adhesive members 230 is more than one, and the adhesive members 230 are disposed in the opening 221 in a discontinuous manner. It is noted that the shapes of the opening 221 and the adhesive member 230 can be designed to be rectangular, trapezoid, elliptical or other shapes.

Figure 7:
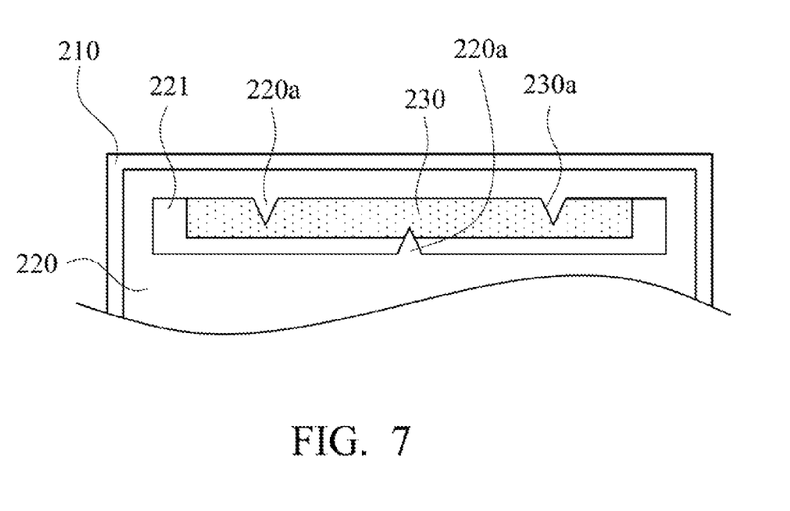
FIG. 7 is a schematic structural diagram showing a reflecting film adhered to a back plate in accordance with a second embodiment of the present invention.

Referring to FIG. 7, FIG. 7 is a schematic structural diagram showing the reflecting film adhered to the back plate in accordance with a second embodiment of the present invention. In some embodiments, the adhesive member 230 can be engaged within the reflecting film 220. The reflecting film 220 includes at least one position-limiting structure 220a, and the adhesive member 230 includes at least one position-limiting portion 230a corresponding to the position-limiting structure 220a. In one embodiment, the position-limiting structure 220a is a convex portion protruding from the reflecting film 220 towards the opening 221, and the position-limiting portion 230a is a concave portion recessed into one side of the adhesive member 230. Therefore, workers can align the reflecting film 220 with the adhesive member 230 by engaging the position-limiting structure 220a with the position-limiting portion 230a, so that the reflecting film 220 can be adhered to a correct position of the back plate 210. In addition, the reflecting film 220 can be positioned by engaging the position-limiting structure 220a with the position-limiting portion 230a, thus preventing the reflecting film 220 from displacing the adhesive member 230 due to vibration.

Referring to FIG. 7 again, in some embodiments, the shape and the number of the position-limiting structure 220a and the position-limiting portion 230a can be designed to meet different design requirements. For example, the shapes of the position-limiting structure 220a and the position-limiting portion 230a are triangular, semi-circular, trapezoid, etc. It is noted that, in the embodiment as shown in FIG. 7, the position-limiting structure 220a which is convex and the position-limiting portion 230a which is concave, are merely used as an example for explanation, and embodiments of the present invention are not limited thereto. In other embodiments, the position-limiting structure 220a can be a concave portion and the position-limiting portion 230a can be a convex portion.

Figure 8:
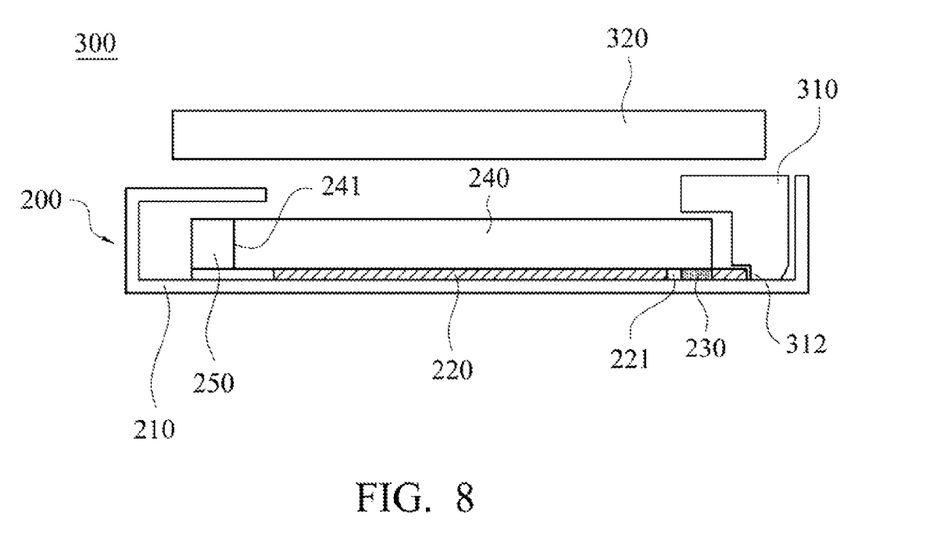
FIG. 8 is a schematic cross-sectional view showing a liquid crystal display in accordance with an embodiment of the present invention.

Simultaneously referring to FIG. 2 and FIG. 8, FIG. 8 is a schematic cross-sectional view showing a liquid crystal display in accordance with an embodiment of the present invention. In the present embodiment, a liquid crystal display 300 includes the backlight module 200 as shown in FIG. 2, a frame 310 and a liquid crystal panel 320. The frame 310 is disposed on the back plate 210, and the liquid crystal panel 320 is disposed on the frame 310. In one embodiment, the frame 310 has a recess 312 which is used to receive a portion of the reflecting film 220. In one example, one side of the reflecting film 220 is located in the recess 312. In other words, the structure of the recess 312 can be designed according to the dimension of the reflecting film 220 without affecting the structure of the frame 310. Therefore, the design of the recess 312 is suitable to a narrower frame 310.

Figure 9:
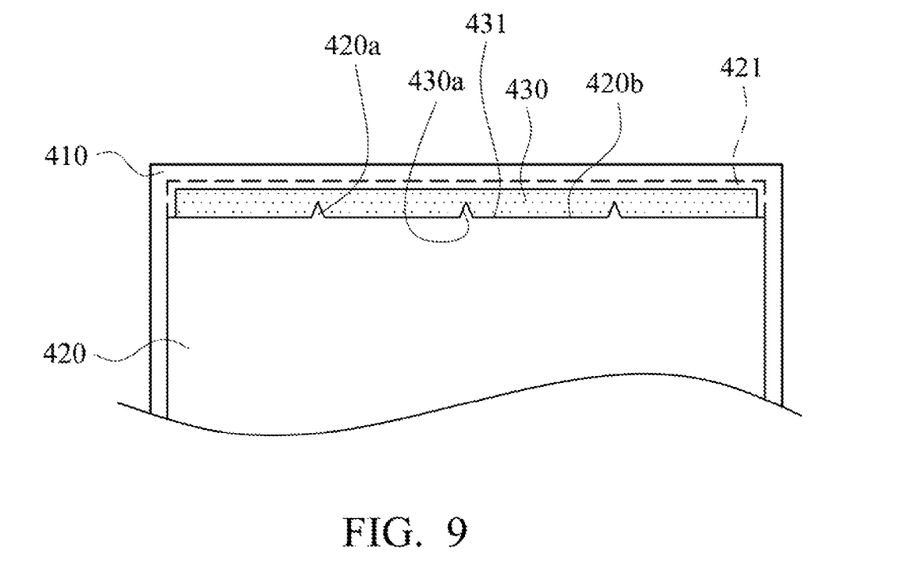
FIG. 9 is a schematic structural diagram showing a reflecting film adhered to a back plate in accordance with a third embodiment of the present invention.
Figure 10:
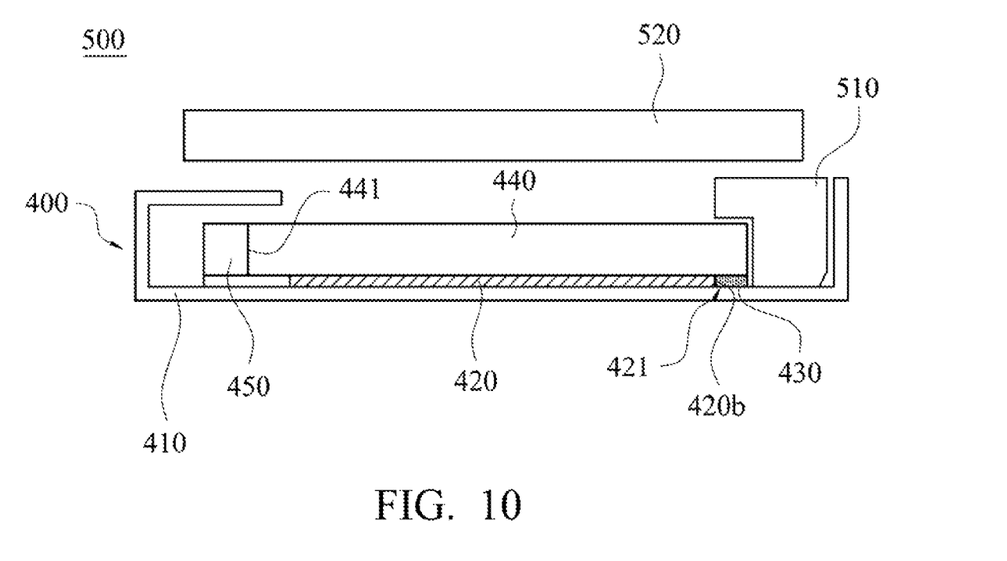
FIG. 10 is a schematic cross-sectional view showing a liquid crystal display in accordance with another embodiment of the present invention.

Referring to FIG. 9 and FIG. 10, FIG. 9 is a schematic structural diagram showing the reflecting film adhered to a back plate in accordance with a third embodiment of the present invention, and FIG. 10 is a schematic cross-sectional view showing a Liquid crystal display in accordance with another embodiment of the present invention. As shown in FIG. 10, a liquid crystal display 500 includes a backlight module 400, a frame 510 and a liquid crystal panel 520. In the present, embodiment, the backlight module 400 includes a back plate 410, a reflecting film 420, at least one adhesive member 430, a light guide plate 440 and a light source 450. The reflecting film 420 is disposed on the back plate 410. As shown in FIG. 10, the reflecting film 420 and the light guide plate 440 are sequentially disposed on the back plate 410. Moreover, an outer side surface 420b of the reflecting film 420 is located in the light guide plate 440 and is separated from an edge of the light guide plate 440. Therefore, when the reflecting film 420 is disposed on the back plate 410, a space 421 is formed between the light guide plate 440 and the back plate 410. It is noted that, in the embodiment as shown in FIG. 10, dimension of the reflecting film 420 which is smaller than that of the light guide plate 440 is merely used as an example for explanation, and embodiments of the present invention are not, limited thereto. In other embodiments, dimension of the reflecting film 420 is equal to dimension of the light guide plate 440, and the reflecting film 420 and the light guide plate 440 are misaligned, so as to form the space 421 between the tight guide plate 440 and the back plate 410.

Referring to FIG. 9 and FIG. 10 again, the space 421 between the light guide plate 440 and the back plate 410 is mainly used to receive the adhesive member 430, and the reflecting film 420 can be adhered to the back plate 410 by using the adhesive member 430. Therefore, when the adhesive member 430 is disposed in the space 421, at least one portion of the adhesive member 430 is connected with the outer side surface 420b of the reflecting film 420. In one example, a side 431 of the adhesive member 430 is totally connected with the outer side surface 420b of the reflecting film 420. In other examples, dimension of the adhesive member 430 is smaller than dimension of the space 421, so that the side 431 of the adhesive member 430 is partially connected with the outer side surface 420b.

Referring to FIG. 9 and FIG. 10 again, the light guide plate 440 is disposed on the reflecting film 420. Moreover, a portion of the light guide plate 440 is overlapped the adhesive member 430 in the space 421 and can be adhered to the back plate 410 through the adhesive member 430. In other words, not only the light guide plate 440 but also the reflecting film 420 can be adhered to the back plate 410. As shown in FIG. 10, the light source 450 is disposed on the back plate 410 to emit light towards a light-indicant surface 441 of the light guide plate 440. In some embodiments, the space 421 and the adhesive member 430 are disposed on a side of the reflecting film 420 away from the light source 450. In other embodiments, the space 421 between the light guide plate 440 and the back plate 410 can be formed close to any sides of the reflecting film 420 to meet different design requirements of backlight module.

As shown in FIG. 9, the adhesive member 430 is engaged with the outer side surface 420b of the reflecting film 420. The reflecting film 420 includes at least one position-limiting structure 420a, and the adhesive member 430 includes at least one position-limiting portion 430a corresponding to the position-limiting structure 420a. In one embodiment, the position-limiting structure 420a is a convex portion protruding from the reflecting film 420, and the position-limiting portion 430a is a concave portion recessed into the side surface 431 of the adhesive member 430 near the outer side surface 420b of the reflecting film 420. Therefore, workers can align the reflecting film 420 with the adhesive member 430 by engaging the position-limiting structure 420a with the position-limiting portion 430a, so that the reflecting film 420 can be adhered to a correct position of the back plate 410. In addition, the reflecting film 420 can be positioned by engaging the position-limiting structure 420a with the position-limiting portion 430a, thus preventing the reflecting film 420 from displacing the adhesive member 430 due to vibration.

In addition, in some embodiments, the shapes and the numbers of the position-limiting structure 420a and the position-limiting portion 430a can be designed to meet different design requirements. For example, the shapes of the position-limiting structure 420a and the position-limiting portion 430a are triangular, semi-circular, trapezoid, etc. It is noted that, in the embodiment as shown in FIG. 9, the position-limiting structure 420a which is convex and the position-limiting portion 430a which is concave, are merely used as an example for explanation, and embodiments of the present invention are not limited thereto. In other embodiments, the position-limiting structure 420a can be a concave portion and the position-limiting portion 430a can be a convex portion.

It is noted that, each of the space 421 and the adhesive members 430 of the embodiment shown in FIG. 9 is one single elongated structure. In some embodiments, the space 421 is elongated, and the number of the adhesive member 430 is more than one, and the adhesive members 430 are disposed in the space 421 in a discontinuous manner. In other embodiments, the space 421 can be defined by the design of the reflecting film 420, and the number of the space 421 is more than one. The space 421 can be located at any two sides or other three sides of the reflecting film 420 away from the light source 450, so as to meet different requirements of the backlight module. In addition, the shapes of the space 421 and the adhesive member 430 can be designed to be rectangular, trapezoid, elliptical or other shapes according to the design of the reflecting film 420.

As shown in FIG. 10, the frame 510 is disposed on the back plate 410, and the liquid crystal panel 520 is disposed on the frame 510. In one embodiment, the frame 510 does not have the recess 312 shown in FIG. 8. In other embodiments, the structure of the frame 510 can be designed according to dimensions of the reflecting film 420 and adhesive member 430 or relative position between reflecting film 420 and adhesive member 430, so as to meet different requirements of the liquid crystal display 500.

According to the aforementioned embodiments of the present invention, the backlight module does not need to use two double faced adhesives to fix the light guide plate and the reflecting film to the back plate, and the openings are provided by the reflecting film to receive the adhesive members, thus reducing overall thickness of backlight module without affecting the function of the backlight module. In addition, when the adhesive member is an omni-directional adhesive, one side or other sides of the adhesive member can be adhered to the inner side of the opening of the reflecting film, and the top surface and the bottom surface of the adhesive member can be respectively adhered to the light guide plate and the back plate, so that the light guide plate and the reflecting film can be adhered to the back plate more stably. When the adhesive member is a double faced adhesive tape, the reflecting film, the adhesive member and the light guide plate can be fixed on the back plate by engaging the position-limiting portion and the position-limiting structure or by placing the adhesive member through the opening.

According to the aforementioned embodiments of the present invention, by designing the reflecting film to be smaller than the light guide plate or by arranging the reflecting film and the light guide plate with misalignment to form a space between the light guide plate and the back plate to receive the adhesive member, thus the whole thickness of backlight module is reduced. In addition, whether the adhesive member is an omni-directional adhesive or a double faced adhesive tape, the adhesive member can be connected with the reflecting film by engaging the position-limiting portion and the position-limiting structure. Meanwhile, the top surface and the bottom surface can be respectively adhered to the light guide plate and the back plate, so that the light guide plate and the reflecting film can be adhered to the back plate more firmly.

According to the aforementioned embodiments of the present invention, the corresponded position-limiting structures and the position-limiting portions are provide by the reflecting film and the adhesive member respectively, so that workers can align the reflecting film with the adhesive member by engaging the position-limiting structure with the position-limiting portion and the reflecting film can be adhered to the correct position of the back plate. Moreover, the reflecting film can be positioned by engaging the position-limiting structure with the position-limiting portion, thus preventing the reflecting film from displacing the adhesive member due to vibration.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
a back plate;
at least one adhesive member disposed on the back plate;
a reflecting film engaged with the adhesive member and positioned on the back plate, wherein the reflecting film has a film body and at least one opening which is formed within the film body and extends from a top surface of the film body to a bottom surface of the film body, and the adhesive member is disposed in the opening, so that the adhesive member is embedded in the reflecting film;
a light guide plate disposed on the reflecting film, wherein a portion of the light guide plate is adhered to the back plate by the adhesive member; and
a light source disposed on the back plate for emitting light towards a light-incident surface of the light guide plate.

2. The backlight module of claim 1, wherein the adhesive member is a double faced adhesive tape or an omni-directional adhesive.

3. The backlight module of claim 1, wherein a portion of the light guide plate is overlapped the opening such that the light guide plate is adhered to the back plate through the adhesive member.

4. The backlight module of claim 3, wherein the at least one adhesive member is corresponding to the at least one opening in a one-to-one manner.

5. The backlight module of claim 3, wherein the opening receives a plurality of the adhesive members.

6. The backlight module of claim 3, wherein there is at least one gap between the adhesive member and an inner side of the opening.

7. The backlight module, comprising:
a back plate;
at least one adhesive member disposed on the back plate;
a reflecting film engaged with the adhesive member and positioned on the back plate, wherein the adhesive member is engaged with at least one side of the reflecting film, wherein at least one side of the reflecting film comprises at least one position-limiting structure, and the adhesive member comprises at least one position-limiting portion correspondingly engaged with the at least one position-limiting structure;

a light guide plate disposed on the reflecting film, wherein a portion of the light guide plate is adhered to the back plate by the adhesive member; and a tight source disposed on the back plate for emitting light towards a light-incident surface of the light guide plate.

8. The backlight module of claim 7, wherein the side of the reflecting film is located in the light guide plate and is separated from an edge of the light guide plate, and a space is formed between the back plate and the light guide plate; and the adhesive member is disposed in the space, and the adhesive member is engaged with the reflecting film by engaging the position-limiting portion with the position-limiting structure.

9. The backlight module of claim 7, wherein the position-limiting structure of the reflecting film is a convex portion or a concave portion, and the position-limiting portion of the adhesive member is another concave portion corresponding to the convex portion or another convex portion corresponding to the concave portion.

10. The backlight of claim 1, wherein the space is located at any side of the reflecting film other than the side which is adjacent to the light source.

11. The backlight module of claim 8, wherein the at least one adhesive member is corresponding to the at least one space in a one-to-one manner.

12. The backlight of claim 8, wherein the space receives a plurality of the adhesive members.

13. A liquid crystal display, comprises:
a backlight module of as claimed in claim 1;
a frame disposed on the back plate; and
a liquid crystal panel disposed on the frame.

14. The liquid crystal display of claim 13, wherein the frame has a recess, and a side of the reflecting film is located in the recess.

15. The backlight module of claim 1, wherein the reflecting film comprises at least one position-limiting structure formed within the opening, and the adhesive member comprises at least one position-limiting portion correspondingly engaged with the at least one position-limiting structure.

16. A liquid crystal display, comprises:
a backlight module of as claimed in claim 7;
a frame disposed on the back plate; and
a liquid crystal panes disposed on the frame.

17. The liquid crystal display of claim 16, wherein the frame has a recess, and a side of the reflecting film is located in the recess.

* * * * *